US008948953B2

United States Patent
Inoue et al.

(10) Patent No.: US 8,948,953 B2
(45) Date of Patent: Feb. 3, 2015

(54) VEHICLE TRAVEL CONTROLLING APPARATUS

(75) Inventors: Gen Inoue, Susono (JP); Yasuhito Ishida, Toyokawa (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 202 days.

(21) Appl. No.: 13/001,830

(22) PCT Filed: Jun. 19, 2009

(86) PCT No.: PCT/JP2009/002806
§ 371 (c)(1),
(2), (4) Date: Mar. 1, 2011

(87) PCT Pub. No.: WO2010/146631
PCT Pub. Date: Dec. 23, 2010

(65) Prior Publication Data
US 2012/0271499 A1  Oct. 25, 2012

(51) Int. Cl.
*G01C 22/00* (2006.01)
*B60W 30/14* (2006.01)
(Continued)

(52) U.S. Cl.
CPC ............... *B60W 30/143* (2013.01); *B60T 7/12* (2013.01); *B60W 40/072* (2013.01); *B60W 40/076* (2013.01); *B60W 10/06* (2013.01); *B60T 2201/04* (2013.01); *B60T 2210/14* (2013.01); *B60T 2260/08* (2013.01); *B60W 2510/182* (2013.01);
(Continued)

(58) Field of Classification Search
CPC ........................... B60G 17/0195; B60W 10/06

USPC ................................................ 701/23, 48, 54
See application file for complete search history.

(56) References Cited

U.S. PATENT DOCUMENTS

2002/0152015 A1* 10/2002 Seto ................................. 701/96
2004/0215385 A1* 10/2004 Aizawa et al. ................. 701/93
(Continued)

FOREIGN PATENT DOCUMENTS

| JP | 10 24821    | 1/1998  |
|----|-------------|---------|
| JP | 2004 90679  | 3/2004  |
| JP | 2004 161173 | 6/2004  |
| JP | 2004 231065 | 8/2004  |
| JP | 2004 531423 | 10/2004 |
| JP | 2007 77871  | 3/2007  |

OTHER PUBLICATIONS

International Search Report issued Sep. 29, 2009 in PCT/JP09/02806 filed Jun. 19, 2009.

*Primary Examiner* — Calvin Cheung
(74) *Attorney, Agent, or Firm* — Oblon, Spivak, McClelland, Maier & Neustadt, L.L.P.

(57) ABSTRACT

In a vehicle travel controlling apparatus including an automatic travel controlling ECU that controls a vehicle in a predetermined travel state by cooperation control of a vehicle driving amount and a vehicle braking amount, the automatic travel controlling ECU is provided with an automatic travel termination controlling unit. The automatic travel termination controlling unit obtains a brake fluid pressure during the cooperation control according to the vehicle driving amount during the cooperation control and a gradient of a road surface on which a vehicle is travelling. When the brake fluid pressure corresponding to a braking operation of a driver is more than the brake fluid pressure during the cooperation control, the automatic travel termination controlling unit terminates the cooperation control to switch operation to a braking operation according to the brake fluid pressure corresponding to the braking operation.

6 Claims, 4 Drawing Sheets

(51) Int. Cl.
*B60T 7/12* (2006.01)
*B60W 40/072* (2012.01)
*B60W 40/076* (2012.01)
*B60W 10/06* (2006.01)

(52) U.S. Cl.
CPC ........ *B60W 2540/10* (2013.01); *B60W 2540/12* (2013.01); *B60W 2550/142* (2013.01); *B60W 2550/143* (2013.01)
USPC .................................. 701/23; 701/48; 701/54

(56) References Cited

U.S. PATENT DOCUMENTS

| | | | |
|---|---|---|---|
| 2005/0216164 A1* | 9/2005 | Sakata | 701/70 |
| 2006/0220451 A1* | 10/2006 | Drumm | 303/114.1 |
| 2009/0093938 A1* | 4/2009 | Isaji et al. | 701/96 |
| 2009/0210124 A1* | 8/2009 | Schonlau et al. | 701/70 |

* cited by examiner

VEHICLE TRAVEL CONTROLLING APPARATUS

FIELD

The present invention relates to a vehicle travel controlling apparatus, and more specifically relates to a vehicle travel controlling apparatus capable of suitably responding to an intention to reduce a vehicle speed that is a braking operation of a driver during an automatic travel control.

BACKGROUND

A vehicle mounts a vehicle travel controlling apparatus to alleviate a driving operation of a vehicle by a driver. The vehicle travel controlling apparatus performs an automatic travel control such as a constant-speed travel control, in which a constant vehicle speed (for example, a low vehicle speed of approximately 10 km/h) control is performed so that the vehicle speed of a vehicle is a target vehicle speed, and a follow-up travel control, that is, an adaptive cruise control (ACC) in which the follow-up travel control is performed so that the own vehicle travels to follow the preceding vehicle. In the vehicle travel controlling apparatus, a target driving force as a target control amount is calculated so that the vehicle speed of a vehicle is a target vehicle speed by an automatic travel controlling ECU. In the vehicle travel controlling apparatus, the calculated target driving force is output to an engine ECU, and the engine ECU controls an engine, which serves as a vehicle speed adjusting device that adjusts the vehicle speed of the vehicle, based on the target driving force. For example, the following Patent Literature 1 discloses a technique for performing the automatic travel control of the constant-speed travel.

The following Patent Literature 2 discloses a technique at the time of starting a vehicle on a slope. In this technique, a vehicle braking torque is changed according to the inclination of the slope, whereby the start of the vehicle is supported. The following Patent Literature 3 discloses a technique used when a vehicle traverses a step. In this technique, when it is detected that a vehicle climbs on a step, a driving torque is suppressed, whereby the increase in the vehicle speed is suppressed when the vehicle descends from the step. The following Patent Literature 4 discloses a braking control device. When a master cylinder pressure is more than a wheel cylinder pressure during the automatic braking control, the braking control device releases the automatic braking to switch the control based on the wheel cylinder pressure to the control based on the master cylinder pressure.

CITATION LIST

Patent Literature

Patent Literature 1: Japanese Patent Application Laid-open No. 2004-90679
Patent Literature 2: Japanese Patent Application National Publication No. 2004-531423
Patent Literature 3: Japanese Patent Application Laid-open No. 2007-77871
Patent Literature 4: Japanese Patent Application Laid-open No. 2004-161173

SUMMARY

Technical Problem

The operation of terminating the constant-speed travel control of the automatic travel control can be executed with a driver's braking operation as a start. In the automatic travel control, the driver's braking operation can trigger switching from a braking state according to the automatic braking control to a braking state according to the driver's braking operation. However, just because the driver's braking operation has been detected, if the automatic travel control is merely terminated, a difference occurs in the vehicle braking force before and after the switching of the braking state, and the difference may be expressed in the behavior of the vehicle. Namely, if the switching is not suitably performed, in the vehicle a deceleration intended by the driver's braking operation may not be able to be produced before and after the switching. If an accurate brake fluid pressure during the automatic travel control cannot be grasped, when it is judged that the brake fluid pressure (the master cylinder pressure) according to the driver's braking operation is more than the brake fluid pressure during the automatic travel control, in actual the brake fluid pressure according to the driver's braking operation is lower than the brake fluid pressure during the automatic travel control, and the deceleration of the vehicle is reduced by the termination of the automatic travel control; therefore, the vehicle speed may be increased.

Thus, an object of the present invention is to improve the disadvantages of the conventional examples and to provide a vehicle travel controlling apparatus which can suitably respond to a driver's intention to reduce a vehicle speed that is a driver's braking operation during an automatic travel control.

Solution to Problem

In order to achieve the above mentioned object, in the present invention, a vehicle travel controlling apparatus including an automatic travel controlling means that controls a vehicle in a predetermined travel state by cooperation control of a vehicle driving amount and a vehicle braking amount, includes an automatic travel termination controlling means that obtains a brake fluid pressure during the cooperation control according to the vehicle driving amount during the cooperation control and a gradient of a road surface on which a vehicle is traveling and, when the brake fluid pressure corresponding to a braking operation of a driver is more than the brake fluid pressure during the cooperation control, terminates the cooperation control to switch operation to braking operation according to the brake fluid pressure corresponding to the braking operation.

Here, it is preferable that the automatic travel termination controlling means is configured that, when the road on which the vehicle is travelling is a regular road, the obtained brake fluid pressure during the cooperation control is set as a threshold value for comparing with the brake fluid pressure corresponding to the braking operation, and, when the road on which the vehicle is travelling is an irregular road, a value obtained by correcting the threshold value to be larger than the threshold value is set as a threshold value for comparing with the brake fluid pressure corresponding to the braking operation.

Advantageous Effects of Invention

In a vehicle travel controlling apparatus according to the present invention, an accurate brake fluid pressure during a cooperation control is obtained considering even a gradient of a road surface, and when the brake fluid pressure according to a driver's braking operation is more than the brake fluid pressure, an automatic travel control is terminated. Accordingly, from when the driver performs the braking operation to when the brake fluid pressure according to the driver's braking operation is more than the brake fluid pressure during the cooperation control, the vehicle continues to travel in a predetermined traveling state according to the cooperation control. In the vehicle, when the brake fluid pressure according to the braking operation is more than the brake fluid pressure during the cooperation control, the cooperation control is terminated, and the vehicle speed is reduced with a vehicle braking amount corresponding to the brake fluid pressure according to the braking operation. Thus, in the vehicle travel controlling apparatus, when the driver's braking operation is performed, the automatic travel control is terminated without increasing the vehicle speed, and thereafter, the vehicle speed can be reduced with the vehicle braking amount according to the driver's intention.

DESCRIPTION OF EMBODIMENTS

Hereinafter, an embodiment of a vehicle travel controlling apparatus according to the present invention will be described in detail based on the drawings. The present invention is not limited to the embodiment.

Embodiment

An embodiment of the vehicle travel controlling apparatus according to the present invention will be described based on FIGS. 1 to 4.

Figure 1:
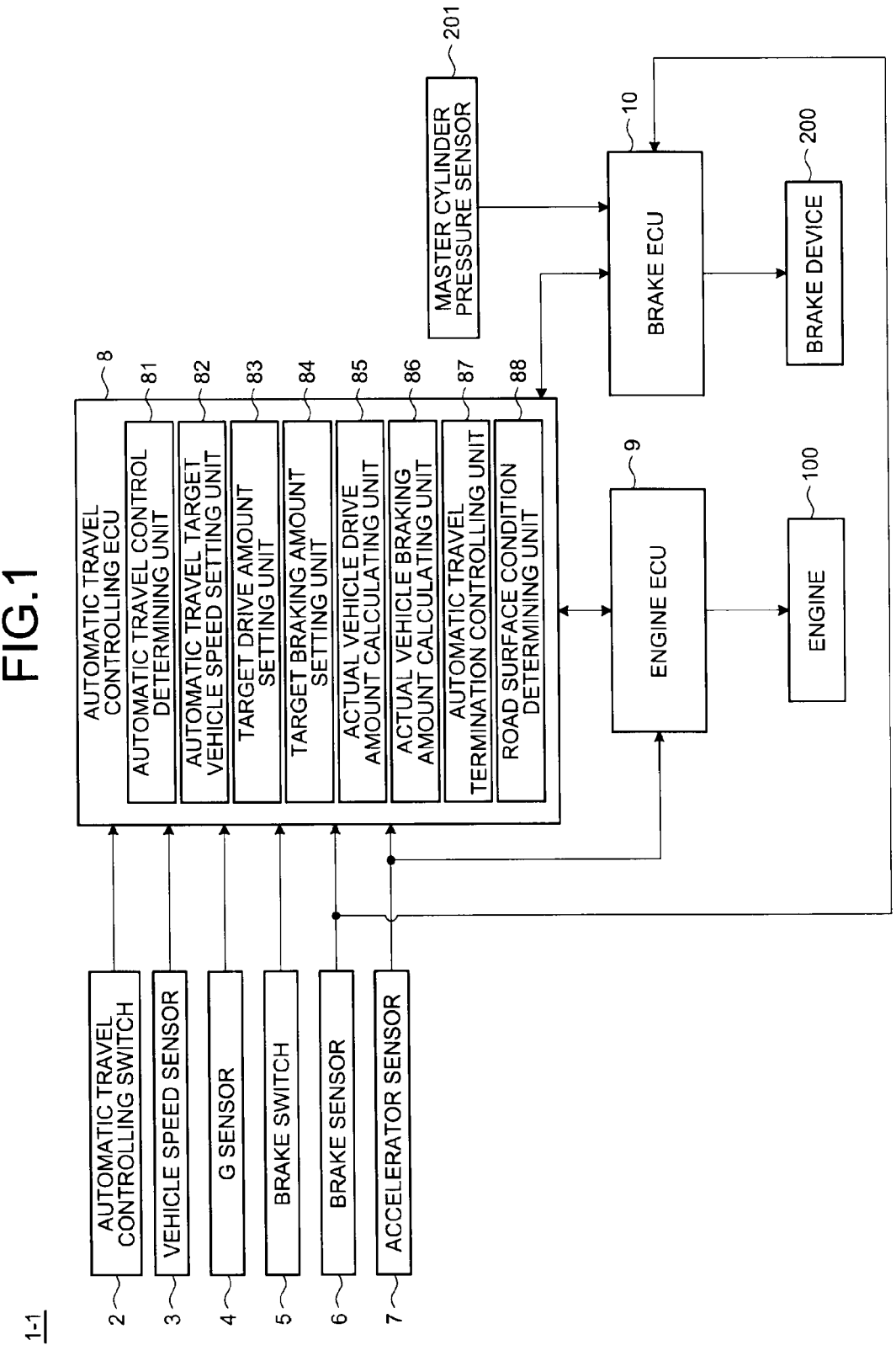
FIG. 1 is a view showing an example of a constitution of a vehicle travel controlling apparatus according to the present invention.

First, a constitution of the vehicle travel controlling apparatus of the present embodiment will be described using FIG. 1. Reference numeral 1-1 of FIG. 1 denotes the vehicle travel controlling apparatus of this embodiment. The vehicle travel controlling apparatus 1-1 is mounted in a vehicle (not shown) and performs an automatic travel control so that the vehicle speed of the vehicle is a target vehicle speed. The vehicle travel controlling apparatus 1-1 of this embodiment is provided with an automatic travel controlling switch 2, a vehicle speed sensor 3, a G sensor 4, a brake switch 5, a brake sensor 6, an accelerator sensor 7, an automatic travel controlling ECU 8, an engine ECU 9, and a brake ECU 10.

The vehicle of this embodiment has a vehicle speed adjusting device for adjusting the vehicle speed. As the vehicle speed adjusting device, there are provided an engine 100 and a brake device 200 shown in FIG. 1. The engine 100 increases and decreases a vehicle driving force Fvd or a vehicle driving torque Tvd as a vehicle driving amount with increase and decrease of an engine output torque to adjust the vehicle speed. The brake device 200 increases and decreases a vehicle braking force Fvb or a vehicle braking torque Tvb as a vehicle braking amount with increase and decrease of a brake fluid pressure to adjust the vehicle speed. The vehicle driving force Fvd and the vehicle braking force Fvb act as a force in backward and forward directions of the vehicle to the gravity center of the vehicle, for example. The vehicle driving torque Tvd is a rotary torque in a driving direction that acts to a drive shaft due to transmission of the engine output torque as an engine drive amount. In the case of a four-wheel-drive vehicle, the vehicle driving torque Tvd is the sum of the rotary torques acting to the front and rear drive shafts. The vehicle braking torque Tvb is the sum of the rotary torques in the braking direction that act to the front and rear axles due to generation of a wheel braking torque as a wheel braking amount of each wheel. In one axle, the sum of the wheel braking torques acting to the wheels on the axle is the rotary torque associated with the wheel braking torque acting to the axle.

The engine 100 is actuated by the engine ECU 9 based on a target engine output torque as a target engine drive amount. Namely, the engine output torque corresponding to the target engine output torque is output from an output shaft of the engine 100 under an instruction from the engine ECU 9. For example, in the engine 100, even if a driver does not perform a depressing operation of an accelerator pedal as a drive operating means (not shown), the target engine output torque set by the automatic travel controlling ECU 8 is output according to the target vehicle driving amount (a target vehicle driving force Fvdt or a target vehicle driving torque Tvdt). The engine 100 further outputs the target engine output torque set by the engine ECU 9 based on the depressing amount of the accelerator pedal by the driver. The engine output torque output from the engine 100 is transmitted to a drive shaft through a transmission (not shown) or the like and then transmitted to drive wheels (for example, in this case, all wheels).

Meanwhile, the brake device 200 supplies the brake fluid pressure with different magnitudes for each wheel and can generate individual wheel braking torques. The brake device 200 is actuated by the brake ECU 10 based on the target wheel braking torque as the target wheel braking amount of a wheel to be controlled. At this time, an actuator (not shown) as brake fluid pressure regulating means increases or decreases the brake fluid pressure of the wheel to be controlled, whereby the target wheel braking torque is generated. The actuator is controlled by the brake ECU 10 and can increase or decrease the brake fluid pressure due to the control, that is, can increase or decrease the amount of the wheel braking torque for each wheel. For example, in the brake device 200, even if a driver does not perform the depressing operation of the accelerator pedal as braking operation means (not shown), the target wheel braking torque, set by the automatic travel controlling ECU 8, is generated in the wheel to be controlled according to the target vehicle braking amount (a target vehicle braking force Fvbt or a target vehicle braking torque Tvbt).

The brake device 200 further generates the wheel braking torque in each wheel based on the decelerating operation by the driver, that is, the depressing operation of the accelerator pedal by the driver. Namely, in the brake device 200, the wheel braking torque, which corresponds to the brake fluid pressure (hereinafter referred to as a "master cylinder pressure") of a master cylinder (not shown) generated with the driver's accelerating operation, is made to act to each wheel. Further, in the brake device 200, the wheel braking torque in which the master cylinder pressure of the brake device 200 is increased or decreased by the actuator can be generated in the wheel to be controlled.

Hereinafter, the automatic travel controlling switch 2, the vehicle speed sensor 3, the G sensor 4, the brake switch 5, the brake sensor 6, the accelerator sensor 7, the automatic travel controlling ECU 8, the engine ECU 9, the brake ECU 10 constituting the vehicle travel controlling apparatus 1-1 will be described in detail.

First, the automatic travel controlling switch 2 is a setting means or an instruction means of an automatic travel target vehicle speed Vo by a driver and is a control start trigger. Specifically, the automatic travel controlling switch 2 is provided in an interior of a vehicle and is turned on by an operation by the driver. The automatic travel controlling switch 2 is connected to the automatic travel controlling ECU 8, and when the automatic travel controlling switch 2 is turned on by the operation by the driver, the automatic travel controlling switch 2 outputs an ON signal to the automatic travel controlling ECU 8. According to this constitution, the automatic travel controlling switch 2 becomes the control start trigger when the automatic travel controlling ECU 8 starts the automatic travel control.

The vehicle speed sensor 3 detects a vehicle speed V of a vehicle. The vehicle speed sensor 3 is connected to the automatic travel controlling ECU 8, and the detected vehicle speed V of a vehicle is output to the automatic travel controlling ECU 8. As the vehicle speed sensor 3, a wheel speed sensor provided in each wheel of the vehicle can be utilized, for example. In this case, the automatic travel controlling ECU 8 calculates the vehicle speed V of the vehicle based on a wheel speed VW of each wheel detected by each of the wheel speed sensors as the vehicle speed sensor 3.

The G sensor 4 is a gradient detection means for a road surface with which a vehicle is in contact. The G sensor 4 detects an inclination of a vehicle. Namely, the G sensor 4 detects a gradient θ of a road surface with which a vehicle is in contact presently. The G sensor 4 is connected to the automatic travel controlling ECU 8, and the detected gradient θ is output to the automatic travel controlling ECU 8. Here, the gradient θ of an upward slope is detected as a positive value, and the gradient θ of a downward slope is detected as a negative value.

The brake switch 5 is a braking operation detecting means. The brake switch 5 detects the braking operation (the decelerating operation) by a driver. The brake switch 5 is turned on when a brake pedal provided in an interior of a vehicle is depressed by a driver. The brake switch 5 is connected to the automatic travel controlling ECU 8, and when the brake pedal is depressed by a driver to turn on the brake switch 5, the brake switch 5 outputs an ON signal to the automatic travel controlling ECU 8. According to this constitution, whether or not the driver's braking operation is performed can be judged by the automatic travel controlling ECU 8.

The brake sensor 6 is a decelerating operation amount detecting means. The brake sensor 6 detects the amount of the decelerating operation by a driver. The brake sensor 6 detects as the decelerating operation amount a depressing amount obtained when the brake pedal provided in an interior of a vehicle is depressed by a driver. The brake sensor 6 is connected to the automatic travel controlling ECU 8 and outputs the amount of the driver's decelerating operation to the automatic travel controlling ECU 8.

The accelerator sensor 7 is an accelerating operation amount detecting means. The accelerator sensor 7 detects the amount of the accelerating operation by a driver. The accelerator sensor 7 detects as the accelerating operation amount the depressing amount obtained when the accelerator pedal provided in an interior of a vehicle is depressed by a driver. The accelerator sensor 7 is connected to the automatic travel controlling ECU 8 and outputs the amount of the driver's accelerating operation to the automatic travel controlling ECU 8.

The automatic travel controlling ECU 8 is a third ECU. The automatic travel controlling ECU 8 is operated as an automatic travel controlling means for controlling a vehicle in a predetermined traveling state. The automatic travel controlling ECU 8 basically calculates the target vehicle driving amount (the target vehicle driving force Fvdt or the target vehicle driving torque Tvdt) and the target vehicle braking amount (the target vehicle braking force Fvbt or the target vehicle braking torque Tvbt) in the automatic travel control so that the vehicle speed V is the automatic travel target vehicle speed Vo set previously or set by a driver. The automatic travel controlling ECU 8 calculates the target engine drive amount (the target engine output torque) of the engine 100 based on the target vehicle driving amount, and, at the same time, calculates the target wheel braking amount (the target wheel braking torque) of each wheel based on the target vehicle braking amount and an acceleration slip rate of the wheels, and outputs these amounts respectively to the engine ECU 9 and the brake ECU 10. Namely, the automatic travel controlling ECU 8 cooperatively controls the engine 100 and the brake device 200. The automatic travel controlling ECU 8 controls the engine 100 through the engine ECU 9 so that the target engine drive amount is output, and, at the same time, controls the brake device 200 through the brake ECU 10 so that the target wheel braking amount is generated. The cooperation control is, so to speak, the cooperation control between the vehicle driving amount and the vehicle braking amount and is the automatic travel control for travelling a vehicle at the automatic travel target vehicle speed Vo.

The automatic travel target vehicle speed Vo has a value different depending on whether or not the vehicle travel controlling apparatus 1-1 performs what kind of automatic travel control. Namely, when the vehicle travel controlling apparatus 1-1 performs the constant-speed travel control, the automatic travel target vehicle speed Vo is set to a low vehicle speed of approximately 10 km/h, for example, and if the vehicle travels at high speed, the automatic travel target vehicle speed Vo is set to a high vehicle speed of 100 km/h, for example. When the vehicle travel controlling apparatus 1-1 performs the follow-up travel control, the vehicle speed of the preceding vehicle is set as the automatic travel target vehicle speed Vo.

Further, the automatic travel controlling ECU 8 calculates or estimates an actual vehicle driving amount and an actual vehicle braking amount according to the engine output torque. For example, the actual vehicle driving amount is an actual vehicle driving force Fvdr and an actual vehicle driving torque Tvdr. The actual vehicle braking amount is an actual vehicle braking force Fvbr and an actual vehicle braking torque Tvbr.

The vehicle receives, as a force in the vehicle backward and forward directions, not only the actual vehicle driving force Fvdr and the actual vehicle braking force Fvbr but also a force (hereinafter referred to as a "slope gradient force") Fh corresponding to the gradient θ of a road surface with which the vehicle is in contact. The actual vehicle driving force Fvdr, the actual vehicle braking force Fvbr, and the slope gradient force Fh are all forces during the automatic travel control acting in the vehicle backward and forward directions. The slope gradient force Fh is the force in the vehicle backward and forward directions acting to the gravity center of a vehicle, for example, and is calculated from the following formula (1) using the gradient θ of a road surface, a gravity acceleration g, and a mass m of a vehicle. In an upward slope, the slope gradient force Fh acts to the rear of a vehicle, that is, acts in a direction of moving backward the vehicle, and in a downward slope, the slope gradient force Fh acts to the front of the vehicle, that is, acts in a direction of moving forward the vehicle. The slope gradient force Fh makes the rotary torque, corresponding to the gradient θ of a road surface, act to the front and rear axles. As described above, the gradient θ detected by the G sensor 4 is detected as a positive value (θ) in the upward slope and detected as a negative value (−θ) in the downward slope. Thus, the slope gradient force Fh is a positive value in the upward slope and a negative value in the downward slope.

$$Fh = m \times g \times \sin\theta \qquad (1)$$

In the vehicle, when the automatic travel control is performed so that the vehicle speed V is the automatic travel target vehicle speed Vo, a force obtained by subtracting the slope gradient force Fh from the actual vehicle driving force Fvdr corresponding to the engine output torque is the vehicle driving force really acting to the vehicle, and a force acting to the vehicle in a direction opposite to the real vehicle driving force is the actual vehicle braking force Fvbr. Thus, the actual vehicle braking force Fvbr can be obtained from the following formula (2):

$$Fvbr = Fvdr - Fh \qquad (2)$$

The automatic travel controlling ECU 8 of this embodiment has an automatic travel control determining unit 81, which is a means of determining necessity of the automatic travel control, and an automatic travel target vehicle speed setting unit 82 which is an automatic travel target vehicle speed setting means, a target drive amount setting unit 83 which is a target drive amount setting means of a vehicle and the engine 100, a target braking amount setting unit 84 which is a target braking amount setting means of a vehicle and a wheel, an actual vehicle driving amount calculating unit 85 which is an actual vehicle driving amount calculating means, an actual vehicle braking amount calculating unit 86 which is an actual vehicle braking amount calculating means, an automatic travel termination controlling unit 87 which is an automatic travel termination controlling means, and a road surface condition determining unit 88 which is a road surface condition determining means. Since the hardware configuration of the automatic travel controlling ECU 8 is already well known, the description will be omitted.

The automatic travel control determining unit 81 determines a driver's intention to start the automatic travel control. The automatic travel control determining unit 81 watches whether or not the ON signal from the automatic travel controlling switch 2 is detected to thereby determine the necessity of the start of the automatic travel control. For example, since the automatic travel controlling switch 2 is operated by the driver to be turned on, and, thus, to output the ON signal, the automatic travel control determining unit 81 at that time determines that the start of the automatic travel control is required.

The automatic travel target vehicle speed setting unit 82 calculates and sets the automatic travel target vehicle speed Vo. For example, in the automatic travel target vehicle speed setting unit 82, if the automatic travel controlling switch 2 is a switch merely switching ON and OFF, when the automatic travel target vehicle speed setting unit 82 receives the ON signal output from the automatic travel controlling switch 2, the automatic travel target vehicle speed setting unit 82 sets the previously determined automatic travel target vehicle speed Vo. The automatic travel target vehicle speed Vo at that time may be a variable changed according to the gradient θ of a road surface, for example. If the automatic travel controlling switch 2 is a switch switching plural automatic travel controlling conditions, that is, plural stages of different target speeds, the automatic travel target vehicle speed setting unit 82 sets the automatic travel target vehicle speed Vo selected by a stage number switching operation of the automatic travel controlling switch 2 by a driver. For example when the driver selects the first stage of this kind of automatic travel controlling switch 2, the automatic travel control determining unit 81 detects the ON signal from the automatic travel controlling switch 2 to determine that the start of the automatic travel control is required, and the automatic travel target vehicle speed setting unit 82 sets the automatic travel target vehicle speed Vo to a first target vehicle speed corresponding to the first stage of the automatic travel controlling switch 2. When the second stage of the automatic travel controlling switch 2 is selected, the automatic travel control determining unit 81 detects the ON signal from the automatic travel controlling switch 2 to determine that the start of the automatic travel control is required, and the automatic travel target vehicle speed setting unit 82 sets the automatic travel target vehicle speed Vo to a second target vehicle speed corresponding to the second stage of the automatic travel controlling switch 2.

The target drive amount setting unit 83 sets the target vehicle driving amount (the target vehicle driving force Fvdt or the target vehicle driving torque Tvdt) and the target engine drive amount (the target engine output torque) in the automatic travel control. The target braking amount setting unit 84 sets the target vehicle braking amount (the target vehicle braking force Fvbt or a target vehicle braking torque Tvbt) and the target vehicle braking amount (the target vehicle braking torque) in the automatic travel control.

The target vehicle driving amount and the target vehicle braking amount are set so that the vehicle speed V is the automatic travel target vehicle speed Vo in comprehensive consideration including the slope gradient force Fh.

For example, when the automatic travel control is performed mainly using the output of the engine 100 as in the case of a flat, an upward slope, and so on, the target vehicle braking amount (the target vehicle braking force Fvbt) is basically set to 0, and the target vehicle driving amount (the target vehicle driving force Fvdt) corresponding to the automatic travel target vehicle speed Vo and the slope gradient force Fh (Fh=0 in a flat) is set. In this case, the automatic travel control by the cooperation control of the vehicle driving amount and the vehicle braking amount may be performed, and, in such case, the target vehicle braking amount is set according to need to impart the braking force.

when the automatic travel control is performed mainly using the braking force of the brake device 200 as in the case of a downward slope and so on, basically, the engine 100 is in an idle state, for example, and the target vehicle driving amount (the target vehicle driving force Fvdt) in the idle state and the target vehicle braking amount (the target vehicle braking force Fvbt) corresponding to the automatic travel target vehicle speed Vo and the slope gradient force Fh are set.

In an irregular road such as a so-called mogul road with a rugged surface, if the road is a flat or an upward slope, while the automatic travel control according to the target vehicle driving amount (the target vehicle driving force Fvdt) corresponding mainly to the automatic travel target vehicle speed Vo and the slope gradient force Fh (Fh=0 in a flat) is performed, the target vehicle braking amount (the target vehicle braking force Fvbt) for maintaining the automatic travel target vehicle speed Vo when the vehicle speed V is likely to be higher than the automatic travel target vehicle speed Vo is set to generate the braking force. Meanwhile, in a mogul road of a downward slope and so on, while the automatic travel control according to the target vehicle braking amount (the target vehicle braking force Fvbt) corresponding mainly to the automatic travel target vehicle speed Vo and the slope gradient force Fh is performed, the target vehicle driving amount (the target vehicle driving force Fvdt) for maintaining the automatic travel target vehicle speed Vo when the vehicle speed V is likely to be higher than the automatic travel target vehicle speed Vo is set to increase the driving force.

The target drive amount setting unit 83 sets the target vehicle driving amount as described above and sets the target engine drive amount (the target engine output torque) realizing the target vehicle driving amount. The target engine drive amount can be obtained in consideration of a gear ratio of a transmission (a transmission ratio), a gear ratio of a differential gear, and so on. For example, the transmission ratio can be grasped based on a transmission stage detected by a shift position sensor. The target drive amount setting unit 83 outputs information of the target engine drive amount to the engine ECU 9. The engine ECU 9 controls injection of fuel and so on so as to generate the target engine drive amount.

The target braking amount setting unit 84 sets the target vehicle braking amount as described above and sets the target wheel braking amount (the target wheel braking torque) of each wheel realizing the target vehicle braking amount. Each of the target wheel braking amounts is calculated in consideration of a predetermined distribution ratio of each wheel, a wheel slip rate, and so on. The target braking amount setting unit 84 outputs information of each of the target wheel braking amounts to the brake ECU 10. The brake ECU 10 sets the target wheel brake fluid pressure, generating the target wheel braking amount, for each wheel, and controls the actuator.

The actual vehicle driving amount calculating unit 85 calculates or estimates the actual vehicle driving amount (the actual vehicle driving force Fvdr or the actual vehicle driving torque Tvdr), and the actual vehicle driving amount is obtained based on an actual engine output torque, a gear ratio of a transmission (a transmission ratio), a gear ratio of a differential gear, and so on. The actual vehicle braking amount calculating unit 86 calculates or estimates the actual vehicle braking amount (the actual vehicle braking force Fvbr or the actual vehicle braking torque Tvbr), and the actual vehicle braking amount is obtained based on the actual wheel braking torque that is an actual wheel braking amount in each wheel, for example. As the actual wheel braking torque, the target wheel braking amount (the target wheel braking torque) set by the target braking amount setting unit 84 may be utilized. Since the actual wheel braking torque is correlated with an actual brake fluid pressure (hereinafter referred to as an "actual wheel brake fluid pressure") acting to a caliper of a wheel and a wheel cylinder, the actual wheel braking torque may be obtained using information of the actual wheel brake fluid pressure. As the actual wheel brake fluid pressure, the target wheel brake fluid pressure may be utilized. Namely, the actual wheel brake fluid pressure in this embodiment is estimated based on the target wheel brake fluid pressure, for example.

The automatic travel termination controlling unit 87 performs control for terminating the automatic travel control being executed. For example, in the automatic travel termination controlling unit 87, a driver turns off the automatic travel controlling switch 2, and when the automatic travel termination controlling unit 87 receives the OFF signal from the automatic travel controlling switch 2, the automatic travel termination controlling unit 87 terminates the automatic travel control. Further, the automatic travel termination controlling unit 87 terminates the automatic travel control with the driver's accelerating operation or braking operation as a start.

Here, the driver's braking operation can be grasped by the ON signal from the brake switch 5. However, when the ON signal is received, the brake fluid pressure corresponding to the driver's braking operation is not always more than the real actual wheel brake fluid pressure during the automatic travel control. Therefore, when the automatic travel control is terminated with the reception of the ON signal associated with the braking operation as a start, the actual wheel brake fluid pressure is reduced to the brake fluid pressure, corresponding to the braking operation at the termination of the automatic travel control or immediately after the termination of the automatic travel control, to reduce the actual wheel braking torque, and therefore, the actual vehicle braking force Fvbr is reduced by the decrease in the actual wheel brake fluid pressure. Thus, since the balance relationship in the formula (2) is broken, an actual vehicle speed Vr may be increased despite a driver's intention to reduce the vehicle speed. In this case, it is difficult for the vehicle to start the deceleration until the brake fluid pressure corresponding to the braking operation increases to the same level as the actual wheel brake fluid pressure immediately before the termination of the automatic travel control. Such an event is significantly apparent particularly in a downward slope in which the slope gradient force Fh is applied in the forward direction. Accordingly, it is preferable that when the brake fluid pressure corresponding to the braking operation increases to the actual wheel brake fluid pressure during the automatic travel control, the automatic travel termination controlling unit 87 terminates the automatic travel control. Hereinafter, a master cylinder pressure Pmc as the brake fluid pressure corresponding to the driver's braking operation is used as an example. However, for example when the master cylinder pressure Pmc is increased or reduced by an actuator in response to the braking operation, the increased or reduced brake fluid pressure is the brake fluid pressure corresponding to the driver's braking operation.

However, as described above, the actual wheel brake fluid pressure grasped by the automatic travel termination controlling unit 87 is an estimate value. The estimate accuracy is not sufficient, and the estimate value deviates from the real actual wheel brake fluid pressure. On the other hand, since the general brake device 200 is provided with a master cylinder pressure sensor 201 detecting the master cylinder pressure Pmc, a true value of the master cylinder pressure Pmc corresponding to the driver's braking operation is grasped. Thus, as shown in the upper views (conventional arts) of FIGS. 2 and 3, if an estimate value of the actual wheel brake fluid pressure is lower than the real actual wheel brake fluid pressure, when the master cylinder pressure Pmc increases to the estimate value of the actual wheel brake fluid pressure during the automatic travel control, the automatic travel control is terminated. Therefore, the real actual wheel brake fluid pressure is reduced to the master cylinder pressure Pmc at the termination of the automatic travel control or immediately after the termination of the automatic travel control, and this may cause the increase in the actual vehicle speed Vr despite a driver's intention to reduce the vehicle speed, as in the above case. Such an event is also significantly apparent particularly in a downward slope. When the estimate value of the actual wheel brake fluid pressure is higher than the real actual wheel brake fluid pressure, although the vehicle speed V is not increased, even if the master cylinder pressure Pmc reaches the real actual wheel brake fluid pressure, the automatic travel control is not terminated, and the master cylinder pressure Pmc continues to increase. Therefore, it takes longer time from the braking operation to when the vehicle speed actually starts to be reduced.

Figure 2:
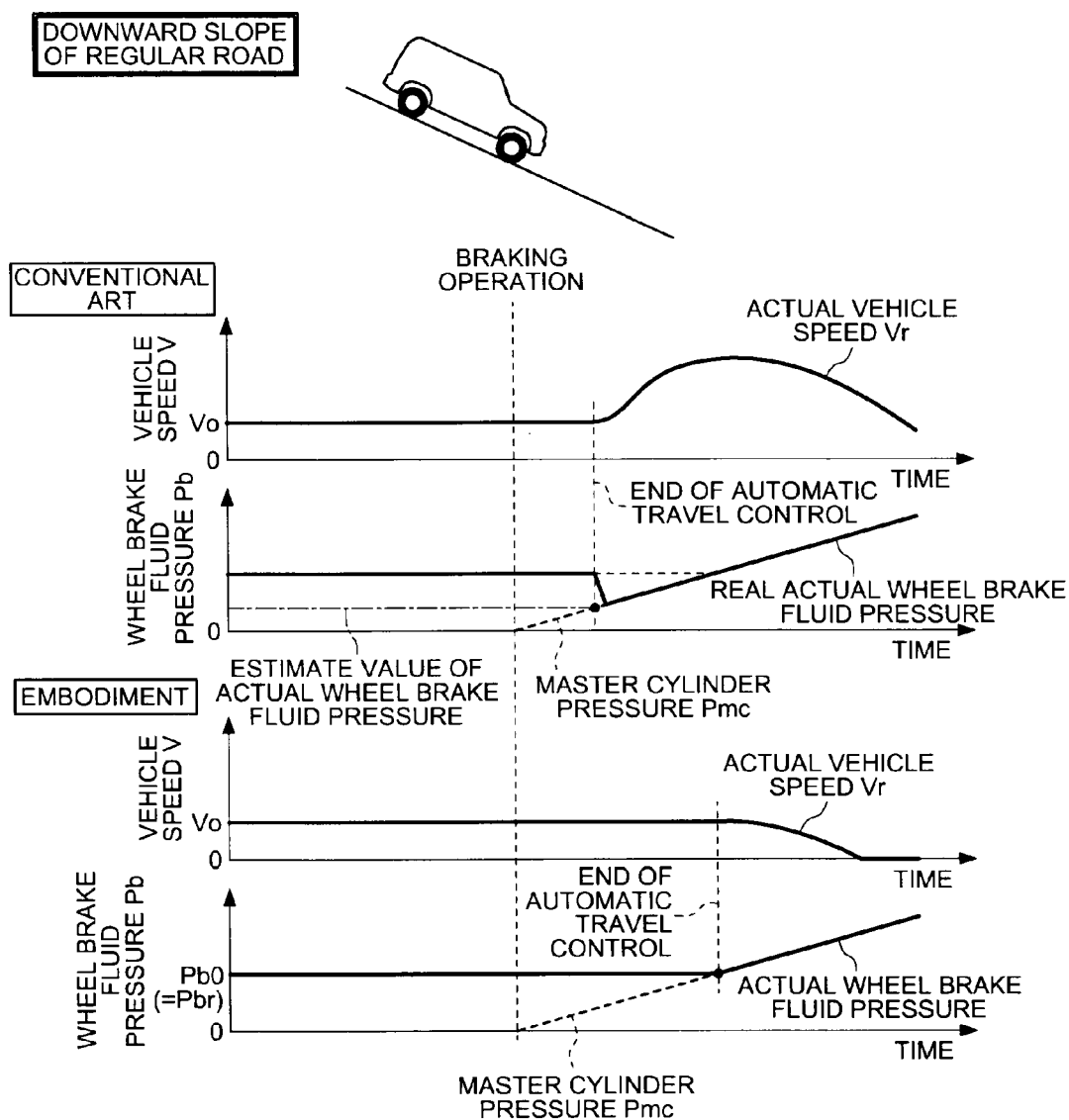
FIG. 2 is a time chart showing the contrast between the conventional braking operation and the braking operation of the present invention when a braking operation is performed during an automatic travel control on a downward slope of a regular road.
Figure 3:
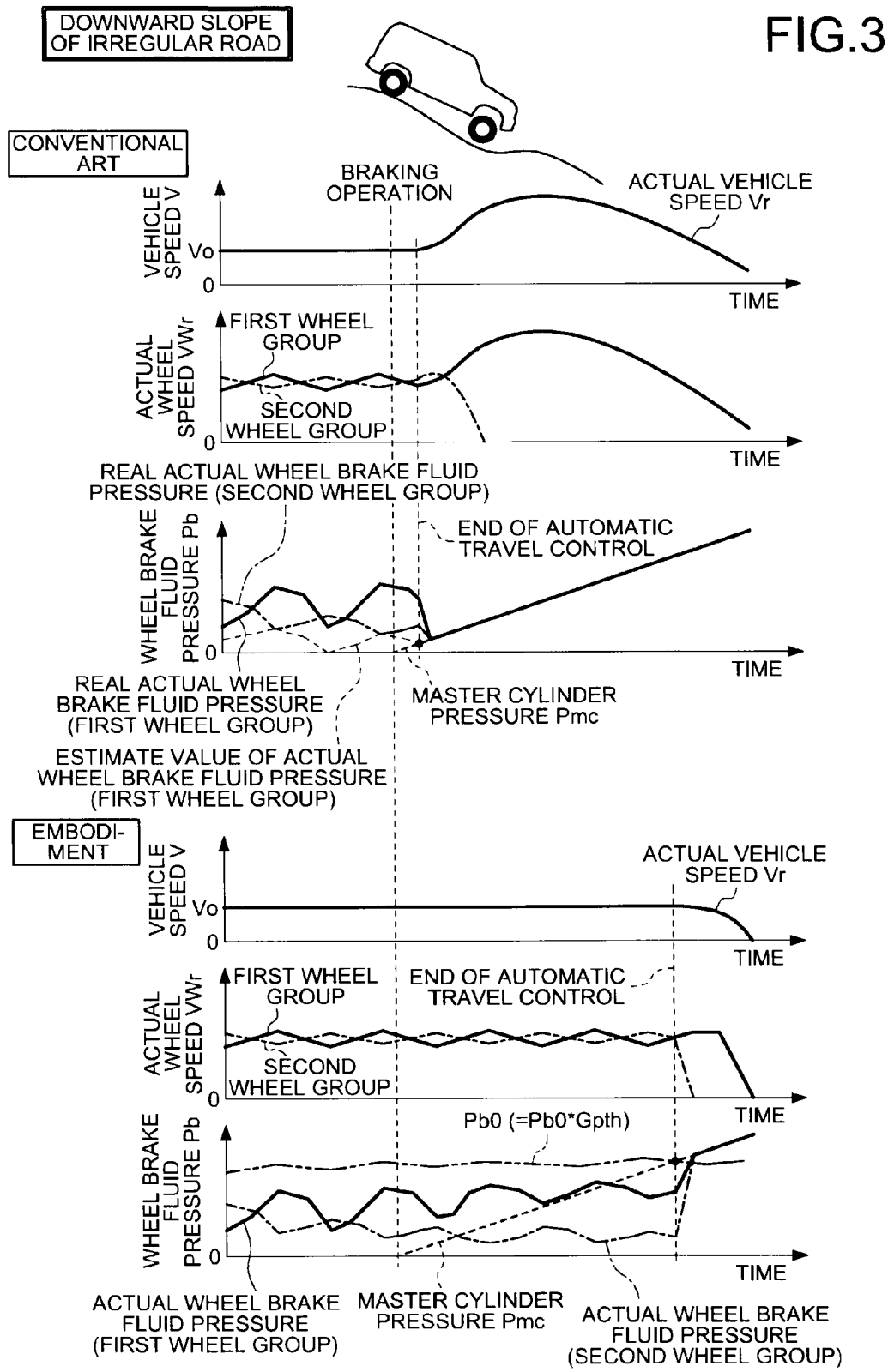
FIG. 3 is a time chart showing the contrast between the conventional braking operation and the braking operation of the present invention when the braking operation is performed during the automatic travel control on a downward slope of an irregular road.

FIG. 2 shows an example when a vehicle travels a downward slope of a regular road. FIG. 3 shows an example when a vehicle travels a downward slope of an irregular road and further shows a state in which there are wheels in contact with a road surface (ground contact wheels) and wheels not in contact with the road surface (non-ground contact wheels). For example, in this example, when two wheels on a diagonal line (for example, a left front wheel and a right rear wheel) float from the road surface, the other two wheels (a right front wheel and a left rear wheel) are in contact with the road surface, and the non-ground contact wheels and the ground contact wheels are alternately replaced. In FIG. 3, the two wheels floating from the road surface are referred to as a first wheel group, and the other two wheels are referred to as a second wheel group. In the upper view of FIG. 3, when the master cylinder pressure Pmc increases to an estimate value of the actual wheel brake fluid pressure of the first wheel group during the automatic travel control, the automatic travel control is terminated. Accordingly, in both the first and second wheel groups, since the real actual wheel brake fluid pressure is reduced to the master cylinder pressure Pmc immediately after the termination of the automatic travel control, an actual wheel speed VWr temporarily increases and then starts to be reduced. At that time, although the non-ground contact wheels immediately stop, the actual wheel speed VWr of the ground contact wheels is larger than that of the non-ground contact wheels, and therefore, the actual vehicle speed Vr increases.

Thus, the automatic travel termination controlling unit 87 of this embodiment estimates the precise actual wheel brake fluid pressure during the automatic travel control (the brake fluid pressure during the cooperation control), and an estimated actual wheel brake fluid pressure Pbr is set as a threshold value (hereinafter referred to as an "automatic travel control termination determining threshold value") Pb0 for use in automatic travel control termination determination based on comparison with the brake fluid pressure corresponding to the driver's braking operation (the master cylinder pressure Pmc), and it is configured so that the automatic travel control is terminated when the brake fluid pressure corresponding to the driver's braking operation increases to the estimated actual wheel brake fluid pressure Pbr (-the automatic travel control termination determining threshold value Pb0). After the termination of the automatic travel control, the operation is switched to the braking operation according to the brake fluid pressure corresponding to the driver's braking operation. In this example, for convenience's sake of explanation, regardless of during the automatic travel control or in the driver's braking operation, the brake fluid pressure is equivalently applied to each wheel. During the automatic travel control on an irregular road, the brake fluid pressure different for each wheel may be applied according to a contact state between the road surface and the wheels.

The actual wheel brake fluid pressure applied to each wheel during the automatic travel control generates the actual vehicle braking force Fvbr in a vehicle. The actual vehicle braking force Fvbr can be accurately obtained using the formula (2), as described above. Namely, the precise actual vehicle braking force Fvbr (the actrual vehicle braking amount) during the automatic travel control can be estimated using the actual vehicle driving force Fvdr (the actual vehicle driving amount) according to the engine output torque during the automatic travel control and the slope gradient force Fh (namely, the gradient θ of a road surface on which a vehicle travels). Accordingly, the precise estimated actual wheel brake fluid pressure Pbr during the automatic travel control can be estimated based on the actual vehicle driving force Fvdr and the slope gradient force Fh (the gradient θ of a road surface on which a vehicle travels). The actual vehicle braking force Fvbr is the braking force for use in suppressing the acceleration force, acting to the vehicle, by the actual vehicle driving force Fvdr and the slope gradient force Fh and making the vehicle travel at a constant speed.

As described above, the automatic travel termination controlling unit 87 judges the necessity of the termination of the automatic travel control, using the information of the estimated actual wheel brake fluid pressure Pbr estimated based on the actual vehicle driving force Fvdr and the slope gradient force Fh (the gradient θ of a road surface). In other words, the automatic travel termination controlling unit 87 changes the ending time period of the automatic travel control according to the actual vehicle driving force Fvdr and the slope gradient force Fh (the gradient θ of a road surface) during the automatic travel control.

When a travelling road is determined as an regular road, the estimated actual wheel brake fluid pressure Pbr obtained as described above can be set as the automatic travel control termination determining threshold value Pb0 as it is. Meanwhile, when it cannot be judged that the travelling road is either a regular road or an irregular road, even if the travelling road is actually a regular road, the travelling road is assumed to be an irregular road. In order to prevent the vehicle speed V from increasing despite the driver's intention to reduce the vehicle speed, the automatic travel control termination determining threshold value Pb0 is corrected to be larger than one set based on the estimated actual wheel brake fluid pressure Pbr (Pb0←Pb0*Gpth). This is because, when wheels float from an irregular road, such a condition is obtained that the vehicle braking force Fvb is reduced by the amount corresponding to the floating wheels to increase the vehicle speed V, and therefore, if in this situation, the comparison determination with the brake fluid pressure (the master cylinder pressure Pmc) corresponding to the driver's braking operation is performed with the automatic travel control termination determining threshold value Pb0 for a regular road, when the brake fluid pressure corresponding to the driver's braking operation is more than the automatic travel control termination determining threshold value Pb0 for a regular road, the actual vehicle braking force Fvbr according to the brake fluid pressure corresponding to the braking operation is insufficient, so that the vehicle speed may be increased faster than the speed at the termination of the automatic travel control.

The "Gpth" is a correction gain of the automatic travel control termination determining threshold value Pb0 in an irregular road, and a value larger than 1 is used. In an irregular road, since up to two wheels may float from the road surface, in this example the correction gain Gpth is more than 1 and not more than 2 ($1.0 \leq Gpth \leq 2.0$). As the correction gain Gpth, at least one predetermined value may be previously set, or the correction gain Gpth may be changed according to the number of the floating wheels. For example, when an unexpected increase in the vehicle speed V is reliably prevented in such a state that there are two floating wheels, since the vehicle braking force Fvb for two wheels is reduced, the correction gain Gpth may be set to 2, that is, the automatic travel control termination determining threshold value Pb0 may be corrected to double.

The road surface condition determining unit 88 is provided for setting the suitable automatic travel control termination determining threshold value Pb0 corresponding to the road surface condition and determines that the travelling road is either a regular road or an irregular road. The road surface condition determining unit 88 determines the road surface condition based on the wheel speed VW of each wheel. In general, in a regular road, all wheels are evenly in contact with the road surface, and there is no speed difference between the wheels, or the speed difference is small. On the other hand, in an irregular road, at least one wheel and at most two wheels on a diagonal line (a left front wheel and a right rear wheel or a right front wheel and a left rear wheel) float from the road surface. Since the wheel speed VW of the floating wheels is lower than the wheel speed VW of the wheels in contact with the road surface, the speed difference between the wheels may be increased. Thus, when there is no speed difference between wheels or the speed difference is small, the travelling road may be judged as a regular road. Meanwhile, when the speed difference is large between the wheels, the travelling road can be judged as an irregular road. Accordingly, the road surface condition determining unit 88 obtains a difference between a maximum wheel speed VWmax and a minimum wheel speed VWmin in each wheel, and the difference is smaller than a predetermined speed difference (hereinafter referred to as a "regular road determination speed difference") V0, the travelling road is judged as the regular road. When the difference is not less than the regular road determination speed difference V0, the travelling road is judged as the irregular road. The regular road determination speed difference V0 is used for considering detection error of the wheel speed and so on and is a positive value close to 0, for example.

The road surface condition determining unit 88 may determine the road surface condition utilizing the following information instead of the wheel speed VW of each wheel. For example, when the travelling road is the regular road, except for a case in which a large lateral acceleration such as a sharp turn is generated and a case in which a large forward/backward acceleration such as sudden acceleration and sudden braking is generated, a load applied to each wheel during travel is not significantly changed. On the other hand, when the travelling road is an irregular road, even if large lateral acceleration and forward/backward acceleration are not generated, the load applied to at least one wheel is significantly changed by an upward thrust from the road surface on which the vehicle is travelling. Since the travelling road and the load applied to each wheel have such a relationship, the road surface condition determining unit 88 may determine the road surface condition utilizing information of a detection signal of a load sensor (not shown) of each wheel. Since the load applied to the wheels during travel is changed in response to the movement of a suspension, when the load applied to at least one wheel is significantly changed, that is, when the travelling road is the irregular road, even if there is no significant change in vehicle height, there is a big change in detection information from a vehicle height sensor (not shown) mounted to an arm of the suspension, for example. On the other hand, when the travelling road is a regular road, except for a case in which large lateral acceleration and forward/backward acceleration are generated, the detection information from the vehicle height sensor does not significantly change during travel. Since the travelling road and the detection information from the vehicle height sensor have such a relationship, the road surface condition determining unit 88 may determine the surface condition utilizing the information of the detection signal of the vehicle height sensor.

Figure 4:
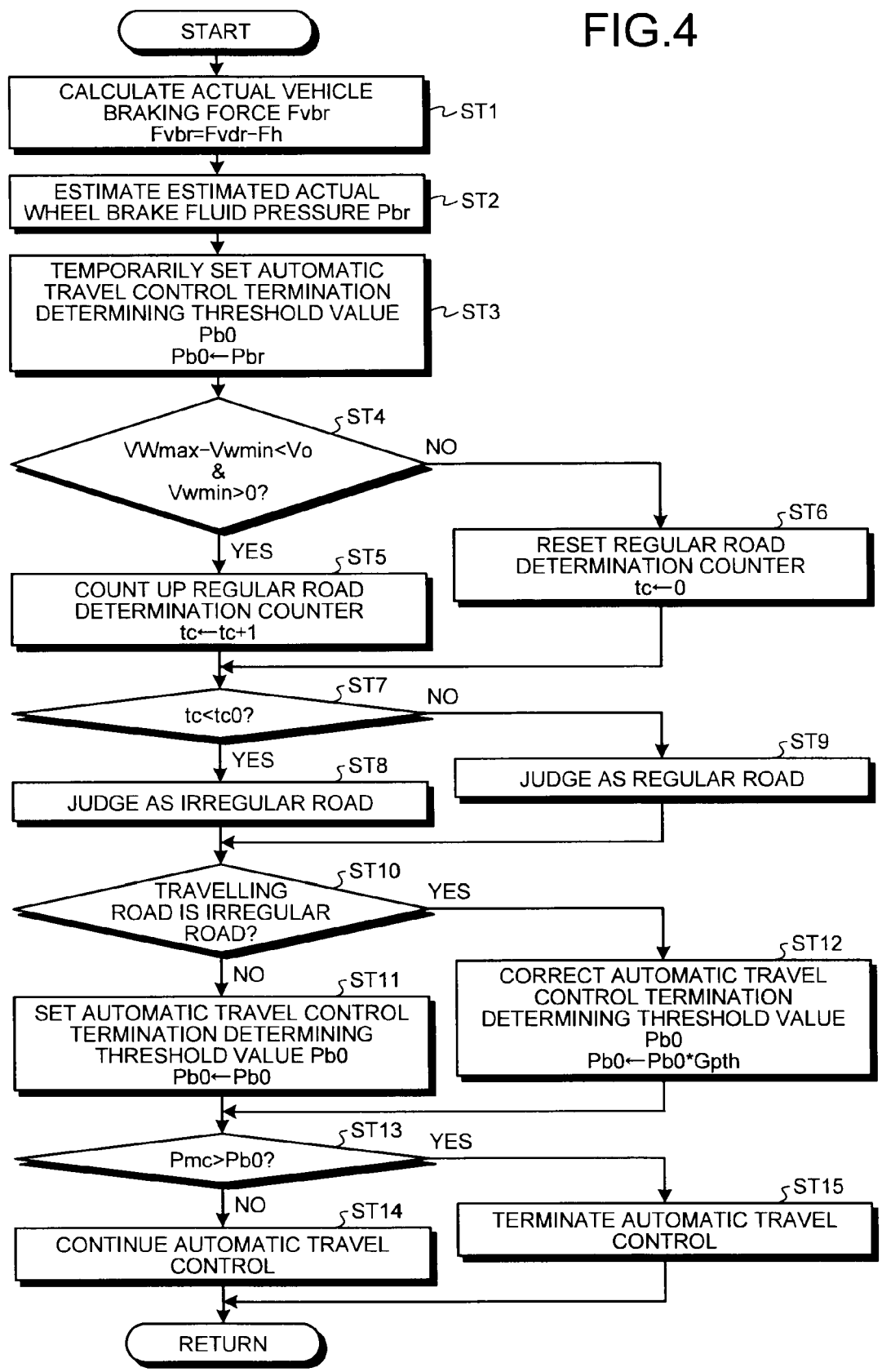
FIG. 4 is a flow chart explaining an operation when the braking operation is performed during the automatic travel control.

Hereinafter, the termination operation of the automatic travel control in the vehicle travel controlling apparatus 1-1 of this embodiment will be described based on the flow chart of FIG. 4.

First, the automatic travel termination controlling unit 87 obtains the current actual vehicle braking force Fvbr based on the formula (2) (Fvbr=Fvdr−Fh) (step ST1). As the actual vehicle braking force Fvbr at that time, the actual vehicle braking force Fvbr obtained by the actual vehicle driving amount calculating unit 85 based on the actual engine output torque and so on is utilized. The slope gradient force Fh is obtained by substituting the gradient θ of the road surface detected by the G sensor 4, the gravity acceleration g, and the mass m of the vehicle into the formula 1 (Fh=m×g×sin θ).

Subsequently, the automatic travel termination controlling unit 87 estimates the current estimated actual wheel brake fluid pressure Pbr based on the actual vehicle braking force Fvbr (step ST2), and temporarily sets the estimated actual wheel brake fluid pressure Pbr as the automatic travel control termination determining threshold value Pb0 (step ST3). In step ST2, the actual wheel braking torque of each wheel capable of making the actual vehicle braking force Fvbr act to the vehicle is obtained, and the brake fluid pressure capable of generating the actual wheel braking torque is obtained for each wheel. In this embodiment, the brake fluid pressure obtained thus is the estimated actual wheel brake fluid pressure Pbr. This embodiment supposes that the brake fluid pressure is evenly supplied to each wheel.

In the vehicle travel controlling apparatus 1-1, the road surface condition determining unit 88 determines that the travelling road is either a regular road or an irregular road as follows.

The road surface condition determining unit 88 first determines that the travelling road is highly likely to be either a regular road or an irregular road (step ST4). Specifically, in step ST4, a wheel with the maximum wheel speed VWmax and a wheel with the minimum wheel speed VWmin are specified based on the information of the wheel speed VW of each wheel. The road surface condition determining unit 88 then determines whether or not the speed difference, obtained by subtracting the minimum wheel speed VWmin from the maximum wheel speed VWmax, is smaller than the predetermined regular road determination speed difference V0, and, at the same time, determines whether or not the minimum wheel speed VWmin is higher than 0 km/h (that is, whether or not a vehicle is travelling). When the road surface condition determining unit 88 determines that the speed difference is smaller than the regular road determination speed difference V0, and, at the same time, the minimum wheel speed VWmin is higher than 0 km/h, the road surface condition determining unit 88 judges that the travelling road is highly likely to be a regular road. On the other hand, when determination results other than this are obtained, the road surface condition determining unit 88 judges that the travelling road is highly likely to be an irregular road.

The road surface condition determining unit 88 judges continuously for a predetermined time that the travelling road is highly likely to be a regular road, whereby the road surface condition determining unit 88 finally judges that the current travelling road is a regular road. In this embodiment, in order to observe the continued passage of time, a counter (hereinafter referred to as a "regular road determination counter") for use in finally determining that the travelling road is a regular road is provided. In the road surface condition determining unit 88, when a count number tc of the regular road determination counter not less than a predetermined count number tc0 is continuously counted, the road surface condition determining unit 88 determines that such a judgment that the travelling road is highly likely to be a regular road is continued for a predetermined time, and the road surface condition determining unit 88 finally judges that the current travelling road is a regular road. The predetermined time (that is, the predetermined count number tc0) is a threshold value for use in finally determining that the travelling road is a regular road, and, for example, the time corresponding to a boundary between a regular road and an irregular road (the count number tc of the regular road determination counter) is set based on results of experiments and simulations on regular road travelling and irregular road travelling.

When the road surface condition determining unit 88 judges that the travelling road is highly likely to be a regular road in step ST4 (that is, when affirmative judgment is made), the count number tc of the regular road determination counter is increased by 1 and counts up (step ST5). On the other hand, when the road surface condition determining unit 88 judges that the travelling road is highly likely to be an irregular road in step ST4 (that is, when negative judgment is made), the count number tc of the regular road determination counter is reset to 0 (step ST6).

The road surface condition determining unit 88 compares the count number tc of the regular road determination counter with the predetermined count number tc0 (step ST7). When the count number tc of the regular road determination counter is smaller than the predetermined count number tc0, the road surface condition determining unit 88 judges that the travelling road is an irregular road (step ST8). When the count number tc of the regular road determination counter not less than the predetermined count number tc0 is counted, the road surface condition determining unit 88 finally judges that the travelling road is a regular road (step ST9).

In the road surface condition determining unit 88 of this embodiment, when it cannot be judged that the travelling road is either a regular road or an irregular road, that is, when the count number tc of the regular surface determination counted in step ST5 is smaller than the predetermined count number tc0, the road surface condition determining unit 88 temporarily judges that the travelling road is an irregular road to thereby prevent the vehicle speed V from increasing based on such an erroneous determination that the travelling road is a regular road, despite the driver's intention to reduce the vehicle speed.

The automatic travel termination controlling unit 87 determines whether or not the travelling road is an irregular road, utilizing the determination result of the road surface condition determining unit 88 (step ST10). When the travelling road is determined as not an irregular road, that is, as a regular road in step ST10, the automatic travel termination controlling unit 87 really sets the automatic travel control termination determining threshold value Pb0, temporarily set in step ST3, as it is, as the automatic travel control termination determining threshold value Pb0 (step ST11). On the other hand, when the travelling road is determined as an irregular road in step ST10, the automatic travel termination controlling unit 87 multiplies the correction gain Gpth to the automatic travel control termination determining threshold value Pb0 temporarily set in step ST3 and corrects the automatic travel control termination determining threshold value Pb0 to one for an irregular road (step ST12).

The automatic travel termination controlling unit 87 compares the master cylinder pressure Pmc according to the driver's braking operation detected by the master cylinder pressure sensor 201 with the automatic travel control termination determining threshold value Pb0 set according to the road surface condition (step ST13). In step ST13, when the travelling road is a regular road, the comparison determination with the automatic travel control termination determining threshold value Pb0 (=the estimated actual wheel brake fluid pressure Pbr) set in step ST11 is performed. When the travelling road is an irregular road, the comparison determination with the automatic travel control termination determining threshold value Pb0 corrected in step ST12 is performed.

In step ST13, when the automatic travel termination controlling unit 87 determines that the master cylinder pressure Pmc according to the driver's braking operation is less than the automatic travel control termination determining threshold value Pb0 that is set in step ST11 if the travelling road is a regular load, or is set in step ST12 if the travelling road is an irregular road, the flow returns to step ST1 while continuing the automatic travel control (step ST14). On the other hand, when the automatic travel termination controlling unit 87 determines that the master cylinder pressure Pmc according to the driver's braking operation is more than the automatic travel control termination determining threshold value Pb0, the automatic travel termination controlling unit 87 terminates the automatic travel control (step ST15).

Specifically, a downward slope of a regular road will be described as an example.

In this case, in step ST2, the estimated actual wheel brake fluid pressure Pbr is estimated based on the actual vehicle braking force Fvbr obtained in step ST1, and the estimated actual wheel brake fluid pressure Pbr is temporarily set to the automatic travel control termination determining threshold value Pb0 in step ST3. In this example, since the travelling road is a regular road, the affirmative judgment is made in step ST4, and the count number tc of the regular road determination counter is increased by 1 in step ST5. In this stage, since the surface condition of the travelling road is not clear, the affirmative judgment is made in step ST7 (tc<tc0), and the travelling road is temporarily judged as an irregular road. Accordingly, in that stage, in step ST12, the temporarily set automatic travel control termination determining threshold value Pb0 is corrected by the correction gain Gpth.

For example, the calculation processing is executed from the start of the automatic travel control at the automatic travel target vehicle speed Vo. According to this constitution, in the automatic travel control, the count number tc of the regular road determination counter is not less than the predetermined count number tc0 during the automatic travel control, and such a correct judgment is made that the travelling road is a regular road before the driver's braking operation, so that the final automatic travel control termination determining threshold value Pb0 (=the estimated actual wheel brake fluid pressure Pbr) is set. The lower view of FIG. 2 shows that state.

In the example shown in the lower view of FIG. 2, when a driver performs the braking operation, the master cylinder pressure Pmc increases. However, in this example, the automatic travel control is continued until it is determined that the master cylinder pressure Pmc is more than the automatic travel control termination determining threshold value Pb0 (=Pbr) in step ST13. Thus, after the driver's braking operation, the vehicle travels the downward slope while maintaining the vehicle speed V at the automatic travel target vehicle speed Vo until the master cylinder pressure Pmc is more than the automatic travel control termination determining threshold value Pb0 (=Pbr). In the vehicle, when the master cylinder pressure Pmc is more than the automatic travel control termination determining threshold value Pb0 (=Pbr), the automatic travel control is terminated in step ST15, and therefore, the vehicle starts to brake with the vehicle braking force Fvb corresponding to the master cylinder pressure Pmc according to the driver's braking operation. Accordingly, in the vehicle, after the master cylinder pressure Pmc is more than the automatic travel control termination determining threshold value Pb0 (=Pbr), the actual vehicle speed Vr is reduced.

Here, the calculation processing is started not at the start of the automatic travel control but after the driver's braking operation. In this case, the automatic travel control termination determining threshold value Pb0 corrected by the correction gain Gpth is utilized in the comparison determination in step ST13 until it becomes apparent that the travelling road is a regular road. The corrected automatic travel control termination determining threshold value Pb0 is larger than the temporarily set automatic travel control termination determining threshold value Pb0 (=the estimated actual wheel brake fluid pressure Pbr), that is, the automatic travel control termination determining threshold value Pb0 for a regular road. Thus, since the negative judgment is made in step ST13, in the vehicle the automatic travel control is continued. It is eventually judged that the travelling road is a regular road, and therefore then the estimated actual wheel brake fluid pressure Pbr becomes the automatic travel control termination determining threshold value Pb0. When the master cylinder pressure Pmc is more than the automatic travel control termination determining threshold value Pb0, the automatic travel control is terminated.

The master cylinder pressure Pmc may be more than the actual wheel brake fluid pressure (=the estimated actual wheel brake fluid pressure Pbr) before the judgment as the regular road. In this case, the automatic travel control is continued until the master cylinder pressure Pmc is more than the corrected automatic travel control termination determining threshold value Pb0. When the master cylinder pressure Pmc is more than the corrected automatic travel control termination determining threshold value Pb0, the braking corresponding to the master cylinder pressure Pmc is started. Accordingly, at that time, it takes some time to generate the vehicle braking force Fvb corresponding to the master cylinder pressure Pmc. However, the automatic travel control is performed while maintaining the vehicle speed V at the automatic travel target vehicle speed Vo until the braking corresponding to the master cylinder pressure Pmc is started, and therefore, it is possible to prevent the vehicle speed V from increasing despite the driver's intention to reduce the vehicle speed.

Next, the case of a downward slope of an irregular road will be described.

Also in this case, as in the case of the downward slope of the regular road, in step ST2 the estimated actual wheel brake fluid pressure Pbr is estimated based on the actual vehicle braking force Fvbr obtained in step ST1, and the estimated actual wheel brake fluid pressure Pbr is temporarily set to the automatic travel control termination determining threshold value Pb0 in step ST3. In this example, since the travelling road is an irregular road, the negative judgment is made in step ST4, the count number tc of the regular road determination counter is reset in step ST6, and the affirmative judgment is made in step ST7 (tc<tc0). Then, in step ST12, the temporarily set automatic travel control termination determining threshold value Pb0 is corrected by the correction gain Gpth. Accordingly, in the irregular road, when the automatic travel control is terminated, the actual vehicle braking force Fvbr capable of suppressing the increase in the vehicle speed V can be generated by the master cylinder pressure Pmc higher than that in the regular road. When the affirmative judgment is made in step ST7, the travelling road is temporarily judged as an irregular road as described above. However, in the irregular road, since the negative judgment is continued to be made in step ST4, it may be recognized that the travelling road is finally judged as an irregular road in practice.

In the example shown in the lower view of FIG. 3, when a driver performs the braking operation, the master cylinder pressure Pmc increases. However, in this example, the automatic travel control is continued until it is determined that the master cylinder pressure Pmc is more than the automatic travel control termination determining threshold value Pb0 (=Pb0*Gpth=Pbr*Gpth) in step ST13. Thus, after the driver's braking operation, the vehicle travels the downward slope while maintaining the vehicle speed V at the automatic travel target vehicle speed Vo until the master cylinder pressure Pmc is more than the automatic travel control termination determining threshold value Pb0 (=Pb0*Gpth). In the vehicle, when the master cylinder pressure Pmc is more than the automatic travel control termination determining threshold value Pb0 (=Pb0*Gpth), the automatic travel control is terminated in step ST15, and therefore, the vehicle starts to brake with the vehicle braking force Fvb corresponding to the master cylinder pressure Pmc according to the driver's braking operation. Accordingly, in the vehicle, after the master cylinder pressure Pmc is more than the automatic travel control termination determining threshold value Pb0 (=Pb0*Gpth), the actual vehicle speed Vr is reduced. At that time, the wheel brake fluid pressures Pb of the first and second wheel groups are increased to the master cylinder pressure Pmc immediately after the termination of the automatic travel control. In this example, the first wheel group includes the ground contact wheels, and the second wheel group includes the non-ground contact wheels. Therefore, the second wheel group stops faster than the first wheel group, and the actual vehicle speed Vr is reduced according to the reduction in the vehicle speed VW of the first wheel group.

As described above, in the vehicle travel controlling apparatus 1-1 of this embodiment, the accurate actual wheel brake fluid pressure (=the estimated actual wheel brake fluid pressure Pbr) during the automatic travel control is obtained considering even the gradient θ of a road surface, and when the master cylinder pressure Pmc according to the driver's braking operation is more than the actual wheel brake fluid pressure, the automatic travel control is terminated. Accordingly, after the driver's braking operation, the automatic travel control is continued in the vehicle while maintaining the automatic travel target vehicle speed Vo until the master cylinder pressure Pmc is more than the actual wheel brake fluid pressure during the automatic travel control. In the vehicle, when the master cylinder pressure Pmc is more than the actual wheel brake fluid pressure during the automatic travel control, the automatic travel control is terminated, and the vehicle speed is reduced with the vehicle braking force Fvb corresponding to the master cylinder pressure Pmc. Thus, in the vehicle travel controlling apparatus 1-1, when the driver's braking operation is performed, the automatic travel control is terminated so that the vehicle speed is not more than the automatic travel target vehicle speed Vo, and thereafter, the vehicle speed can be reduced with the vehicle braking force Fvb according to the driver's intension.

INDUSTRIAL APPLICABILITY

As described above, the vehicle travel controlling apparatus according to the present invention is useful in the technique of executing the braking operation according to the braking operation of a driver during the automatic travel control.

REFERENCE SIGNS LIST

1-1 VEHICLE TRAVEL CONTROLLING APPARATUS
2 AUTOMATIC TRAVEL CONTROLLING SWITCH
3 VEHICLE SPEED SENSOR

- 4 G SENSOR
- 5 BRAKE SWITCH
- 6 BRAKE SENSOR
- 8 AUTOMATIC TRAVEL CONTROLLING ECU
- 81 AUTOMATIC TRAVEL CONTROL DETERMINING UNIT
- 82 AUTOMATIC TRAVEL TARGET VEHICLE SPEED SETTING UNIT
- 83 TARGET DRIVE AMOUNT SETTING UNIT
- 84 TARGET BRAKING AMOUNT SETTING UNIT
- 85 ACTUAL VEHICLE DRIVING AMOUNT CALCULATING UNIT
- 86 ACTUAL VEHICLE BRAKING AMOUNT CALCULATING UNIT
- 87 AUTOMATIC TRAVEL TERMINATION CONTROLLING UNIT
- 88 ROAD SURFACE CONDITION DETERMINING UNIT
- 9 ENGINE ECU
- 10 BRAKE ECU
- 100 ENGINE
- 200 BRAKE DEVICE
- 201 MASTER CYLINCER PRESSURE SENSOR
- $\theta$ GRADIENT

The invention claimed is:

1. A vehicle travel controlling apparatus including an automatic travel controlling unit that controls a vehicle in a predetermined travel state by cooperation control of a vehicle driving amount and a vehicle braking amount, comprising:
a control unit that:
   obtains an actual wheel brake fluid pressure value during the cooperation control according to the vehicle driving amount during the cooperation control and a gradient of a road surface on which a vehicle is traveling, and
   is programmed to terminate the cooperation control when detecting that a master cylinder pressure value corresponding to a braking operation of a driver exceeds the obtained actual wheel brake fluid pressure value during the cooperation control.

2. The vehicle travel controlling apparatus according to claim 1, wherein the control unit is configured such that:
   when the road on which the vehicle is travelling is a regular road, the obtained actual wheel brake fluid pressure value during the cooperation control is set as a threshold value for comparing with the master cylinder pressure value corresponding to the braking operation,
   when the road on which the vehicle is travelling is an irregular road, a value obtained by correcting the threshold value to be larger than the threshold value is set as a threshold value for comparing with the master cylinder pressure corresponding to the braking operation, and
   the cooperation control is terminated when detecting that the master cylinder pressure value corresponding to the breaking operation exceeds the set threshold value.

3. The vehicle travel controlling apparatus according to claim 2, wherein the control unit is configured such that:
   when the road on which the vehicle is travelling is the irregular road, a correction gain which corrects the threshold value is changed according to a number of floating wheels.

4. The vehicle travel controlling apparatus according to claim 3, wherein the control unit is configured such that:
   when the number of floating wheels is two, the correction gain is set to 2.

5. The vehicle travel controlling apparatus according to claim 2, wherein the control unit is configured such that:
   when it cannot be judged that the road on which the vehicle is travelling is either the regular road or the irregular road, the control unit temporarily judges that the road on which the vehicle is travelling is the irregular road.

6. The vehicle travel controlling apparatus according to claim 2, wherein the irregular road is a road with a rugged surface.

* * * * *